H. J. WELCH.
FISHING APPLIANCE.
(No Model.)
No. 580,915. Patented Apr. 20, 1897.
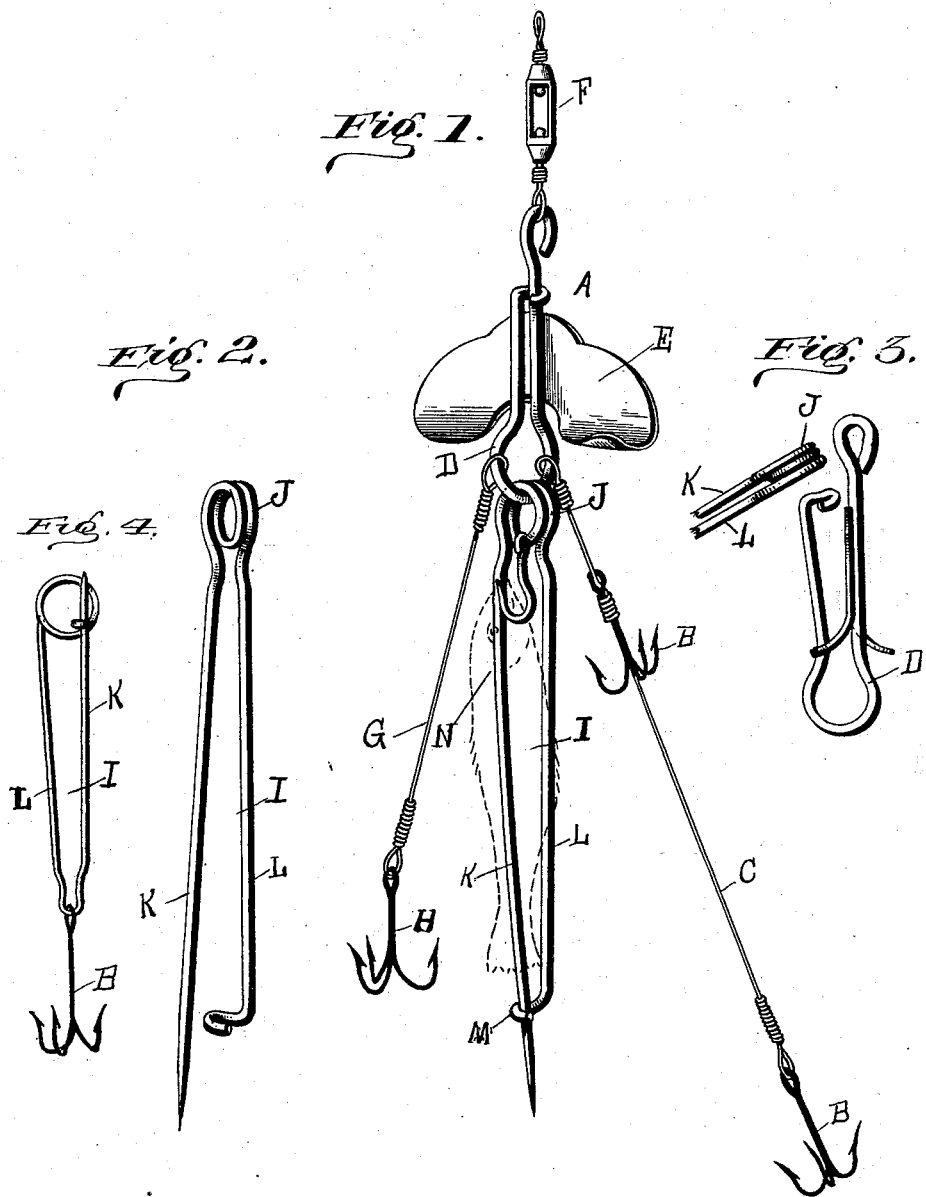
Witnesses:
L. C. Hills.
W. Van Loan.
Inventor,
Henry J. Welch,
by Franklin H. Hough
Atty.

UNITED STATES PATENT OFFICE.

HENRY J. WELCH, OF CARTHAGE, NEW YORK, ASSIGNOR OF ONE-HALF TO CALVIN V. GRAVES, OF NATURAL BRIDGE, NEW YORK.

FISHING APPLIANCE.

SPECIFICATION forming part of Letters Patent No. 580,915, dated April 20, 1897.

Application filed July 31, 1896. Serial No. 601,228. (No model.)

*To all whom it may concern:*

Be it known that I, HENRY J. WELCH, a citizen of the United States, residing at Carthage, in the county of Jefferson and State of New York, have invented certain new and useful Improvements in Fishing Appliances; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in fishing appliances, and it has particular reference to the means employed in securing in place the bait which is used in connection with the various forms of trolling outfits in fishing.

It has heretofore been common in all cases in which live bait, such, for instance, as minnows and other small fish, have been used to attach the bait by hooking it directly upon the hooks which are designed to be employed in catching the fish. This practice is for many reasons objectionable, as the bait can only be properly and securely fastened in place by the exercise of great care, and such of the hooks as are thus employed in retaining the bait are rendered either wholly useless or their utility is greatly impaired as means for catching and retaining the fish that take the bait.

The present invention has for its object the provision of a simple, inexpensive, and efficient bait-holder suitable for use in connection with any of the various forms of appliances intended for use in trolling or other fishing in which minnows or other kinds of bait are used.

To these ends and to such others as the invention may pertain the same consists in the novel construction of my improved form of bait-retainer and in the manner of attaching the same, all as hereinafter more fully described, shown in the accompanying drawings, and then specifically defined in the appended claim.

The invention is clearly illustrated in the accompanying drawings, in which—

Figure 1 is a side elevation of one form of the device and its attachments. Fig. 2 is an enlarged detail in perspective of the bait-retainer. Fig. 3 is an enlarged detail in perspective showing the manner of attaching the bait-retainer. Fig. 4 is a side view of a modified form of bait-retainer with the hooks attached.

Reference now being had to the details of the drawings by letter, A designates an ordinary trolling outfit, consisting in the present instance of two or more clusters or "gangs" of fishing-hooks B B, each of said gangs consisting of three hooks, which are secured back to back, the said gangs being attached to a wire C, one end of which wire is linked to one end of a bar or loop D, which carries a propeller or spoon E of any suitable and well-known form of construction. The opposite end of the bar or wire D has attached thereto the ordinary swivel F, to which the fishing-line is attached. I have shown also in the present instance an independent wire or link G, which is linked at one of its ends to the bar D, and at its free end carries a gang of hooks H.

The particular arrangement of hooks and their connections is immaterial and forms no part of the present invention, which relates solely to the bait-retaining device, which is equally well adapted for use in connection with any of the numerous trolling outfits which are in common use.

This bait-retaining device or attachment I is preferably made of a single piece of wire, which is bent to form a loop J, which engages the loop at the end of the bar or wire D. The wire of which the retainer I is made should be of a spring nature, and the body portion of the device consists of a straight arm K and a shorter arm L, said last-mentioned arm L being provided at its free end with a hook M, designed to engage the sharpened arm K when the arms are locked together to retain the bait, as shown in Fig. 1 of the drawings, in which the bait is outlined in dotted lines.

In use the minnow or other bait N is placed upon the sharpened arm K of the retainer and the said arm is hooked to the arm L. It will at once be seen that by this arrangement the bait may be quickly secured in place or removed, as desired, and that when in use it will be held securely against accidental displacement. The bait-retainer being, as shown in the present instance, entirely independent of the hooks, the said hooks are in no manner obstructed by the bait.

It will be seen that when a bait-retainer such as is shown in Fig. 4 of the drawings is used the gang of hooks is readily attached by simply passing the eye or ring of the gang of hooks over the arm of the retainer. This construction admits of the ready placing and interchange of hooks, when desired.

Having thus described my invention, what I claim to be new, and desire to secure by Letters Patent, is—

In a trolling device, the combination with the looped wire D having gang-hooks secured thereto, of the independent impaling device I held to the looped wire D by loop J, of a bait-suspending hook carried by the loop J and designed to engage with the impaled bait to retain the same in place, substantially as and for the purpose set forth.

In testimony whereof I affix my signature in presence of two witnesses.

HENRY J. WELCH.

Witnesses:
    A. Y. STEWART,
    A. I. BAILEY.